United States Patent
Soshi

(10) Patent No.: US 9,937,589 B2
(45) Date of Patent: Apr. 10, 2018

(54) OBJECT MANUFACTURING FROM A WORK PIECE MADE OF SEPARATE COMPONENTS

(71) Applicants: Advanced Research for Manufacturing Systems, LLC, Davis, CA (US); DMG Mori Seiki Co., Ltd., Yamatokoriyama-shi (JP)

(72) Inventor: Masakazu Soshi, Davis, CA (US)

(73) Assignees: Advanced Research for Manufacturing Systems, LLC, Davis, CA (US); DMG Mori Seiki Co., Ltd., Yamatokoriyama-shi (JP)

( * ) Notice: Subject to any disclaimer, the term of this patent is extended or adjusted under 35 U.S.C. 154(b) by 306 days.

(21) Appl. No.: 14/671,369

(22) Filed: Mar. 27, 2015

(65) Prior Publication Data

US 2016/0282839 A1 Sep. 29, 2016

(51) Int. Cl.
| | | |
|---|---|---|
| G06F 19/00 | (2011.01) |
| B23K 26/342 | (2014.01) |
| G05B 19/4155 | (2006.01) |
| B23K 26/08 | (2014.01) |
| B23K 26/14 | (2014.01) |
| B23K 26/144 | (2014.01) |
| B33Y 10/00 | (2015.01) |
| B33Y 50/02 | (2015.01) |
| B23K 101/20 | (2006.01) |
| B23K 103/00 | (2006.01) |

(52) U.S. Cl.
CPC ............ *B23K 26/342* (2015.10); *B23K 26/08* (2013.01); *B23K 26/14* (2013.01); *B23K 26/144* (2015.10); *B23K 26/1476* (2013.01); *G05B 19/4155* (2013.01); *B23K 2201/20* (2013.01); *B23K 2203/00* (2013.01); *B33Y 10/00* (2014.12); *B33Y 50/02* (2014.12); *G05B 2219/49007* (2013.01); *G05B 2219/49023* (2013.01)

(58) Field of Classification Search
CPC .......................... G05B 19/402; B23K 26/342
USPC ...................................................... 700/161
See application file for complete search history.

(56) References Cited

U.S. PATENT DOCUMENTS

| | | | | |
|---|---|---|---|---|
| 4,597,715 A * | 7/1986 | Coleman | ................. | F03D 1/065 416/229 R |
| 5,618,371 A * | 4/1997 | Sing | ......................... | B27B 1/00 144/345 |
| 2002/0169515 A1* | 11/2002 | Graves | ............... | G05B 13/0275 700/110 |
| 2003/0205316 A1* | 11/2003 | Kai | ........................ | B27L 5/00 156/250 |

(Continued)

*Primary Examiner* — Vincent Tran
(74) *Attorney, Agent, or Firm* — Oblon, McClelland, Maier & Neustadt, L.L.P.

(57) ABSTRACT

A method, non-transitory computer-readable medium, and controller for manufacturing a predetermined object. The method includes machining a plurality of separate components of a work piece based on a final geometry of the predetermined object. The plurality of separate components is selected based on the final geometry of the predetermined object. A first material is added to the work piece such that a first single continuous surface is formed over, or together with, the machined surfaces of the plurality of separate components which is selected based on the final geometry of the predetermined object.

20 Claims, 10 Drawing Sheets

(56) References Cited

U.S. PATENT DOCUMENTS

| | | | |
|---|---|---|---|
| 2005/0269034 A1* | 12/2005 | Gorich | B27D 1/04 |
| | | | 156/556 |
| 2009/0255367 A1* | 10/2009 | Tajiri | B62D 1/06 |
| | | | 74/552 |
| 2011/0168324 A1* | 7/2011 | Ender | B29C 33/301 |
| | | | 156/243 |
| 2015/0170958 A1* | 6/2015 | Stumpf | H01L 21/67092 |
| | | | 438/458 |

* cited by examiner

OBJECT MANUFACTURING FROM A WORK PIECE MADE OF SEPARATE COMPONENTS

BACKGROUND

Field of the Disclosure

This application relates generally to manufacturing a predetermined object. More particularly, the present disclosure relates to manufacturing the predetermined object from a work piece that includes a plurality of separate components.

Description of the Related Art

Manufacturing typically involves a milling process that mills a work piece (e.g., a metal block) to a desired shape. Alternatively, the predetermined object may be manufactured using an additive process, in which a material is successively deposited to form the desired shape. However, these processes are time consuming and, at least in the case of milling, can result in a significant amount of wasted material.

SUMMARY

According to an embodiment of the present disclosure, there is provided a method for manufacturing a predetermined object. The method includes machining a plurality of separate components of a work piece based on a final geometry of the predetermined object. The plurality of separate components is selected based on the final geometry of the predetermined object. A first material is added to the work piece such that a first single continuous surface is formed over, or together with, the machined surfaces of the plurality of separate components which is selected based on the final geometry of the predetermined object.

Further, according to an embodiment of the present disclosure, there is provided a non-transitory computer-readable medium which stores a program which, when executed by a computer, causes at least one machining center to perform the method for manufacturing the predetermined object, as discussed above.

Further, according to an embodiment of the present disclosure, there is provided a controller for manufacturing a predetermined object. The controller includes circuitry that is configured to cause a material removal tool to machine a plurality of separate components of a work piece based on a final geometry of the predetermined object. The plurality of separate components is selected based on the final geometry of the predetermined object. Further, the circuitry is configured to cause a material deposition tool to add a first material to the work piece such that a first single continuous surface is formed over, or together with, the machined surfaces of the plurality of separate components which is selected based on the final geometry of the predetermined object.

The forgoing general description of the illustrative implementations and the following detailed description thereof are merely exemplary aspects of the teachings of this disclosure, and are not restrictive.

DETAILED DESCRIPTION

Figure 1A:
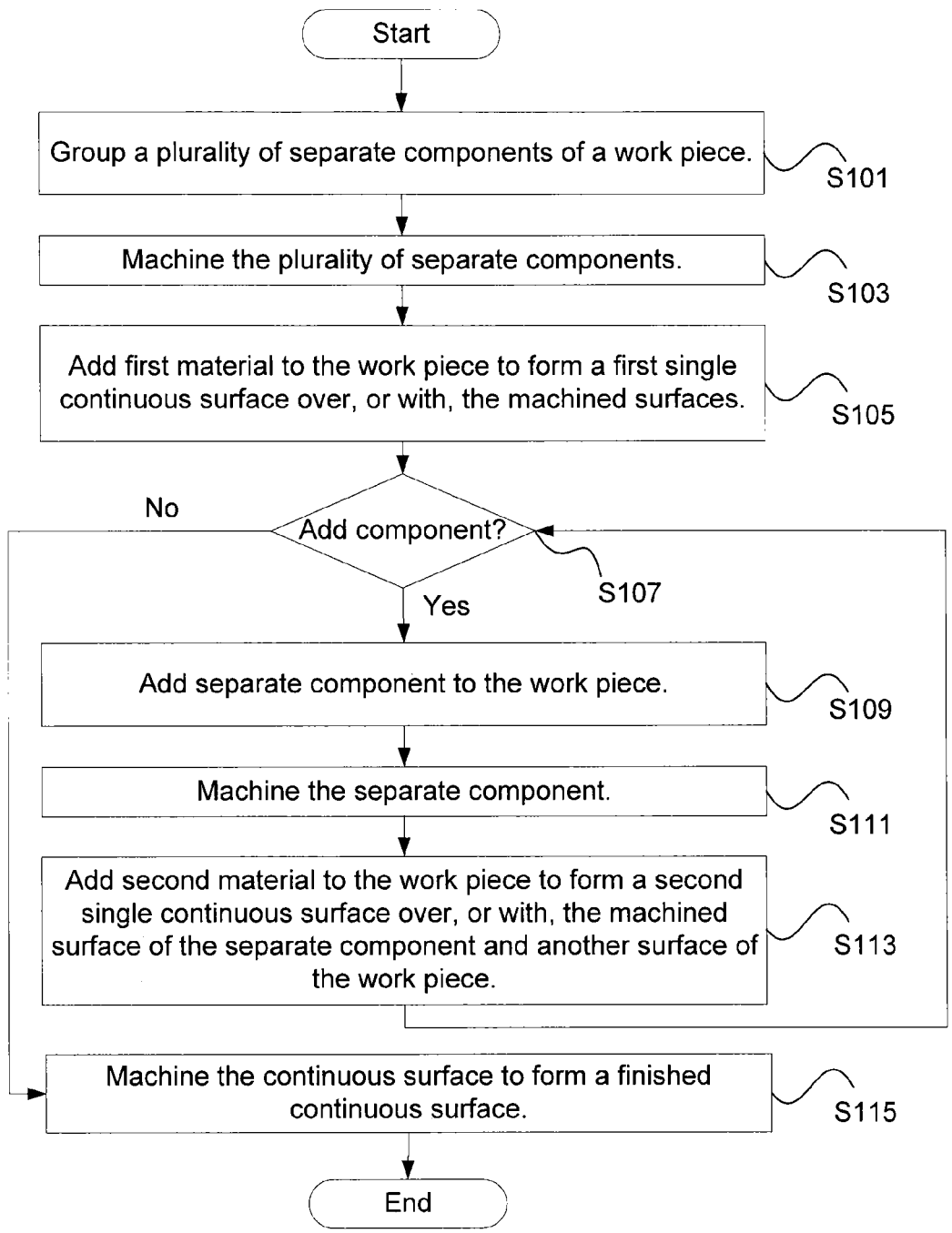
FIG. 1A is a flow chart illustrating a process for manufacturing a predetermined object according to an exemplary embodiment of the present disclosure.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10% or preferably 5% in certain embodiments, and any values therebetween.

FIG. 1A illustrates a process for manufacturing a predetermined object according to one embodiment. The predetermined object is created from a work piece that includes a plurality of separate components. The plurality of separate components is selected based on a final geometry of the predetermined object. For example, the final geometry of the predetermined object may be divided into the plurality of separate components based on component sizes available in inventory. The component selection may be done automatically or manually.

In step S101, the plurality of separate components of the work piece is grouped for pre-shaping. For example, the separate components are secured to a base for pre-shaping. In another example, the base is not required and the separate components are secured to each other for the pre-shaping. Alternatively, the pre-shape of the predetermined object (i.e., initial arrangement of components or approximation of the predetermined object) may be formed by any combination of separate components being secured to the base and/or to each other. The plurality of separate components is secured to the base or to each other using any suitable manner, such as with bolts or other fixture methods, and such a manner that the separate components form a pre-shape of the predetermined object. In certain embodiments, step S101 may include one or a combination of sub-steps for block selection and base preparation.

In step S103, the plurality of separate components is machined based on a final geometry of the predetermined object. For example, a material removal process is performed to further shape one or more of the separate components such that the machined surfaces are similar to the final geometry of the predetermined object.

In step S105, a first material is added to the work piece to form a first single continuous surface over, or with (e.g., together with), one or more of the machined surfaces. For example, the first material is added such that it covers the machined surfaces with a continuous layer of the material to form the first single continuous surface. In another example, the first material is added in spaces separating the plurality of components such that the machined surfaces are connected to form the single continuous surface. A combination of covering machined surfaces with the material and filling spaces between separate components is used to form the first single continuous surface in other embodiments.

Steps S107, S109, S111, and S113 are optional steps of the manufacturing process. One or more of these steps is performed in certain embodiments in which only a subset of the total number of separate components of the work piece is grouped in step S101. In step S107, a determination is made as to whether one or more components is to be added to the work piece. When the determination is that the one or more components is to be added, the one or more components is added in step S109, for example in a manner similar to the grouping described in step S101. The one or more separate components is machined in step S111, and a second material is added to the work piece to form a second single continuous surface over, or with, at least one of the machined surface(s) of the one or more components and, in some cases, another surface of the work piece. The second material is added in a manner that is similar to the adding of the first material described above with respect to step S105. Subsequently, the process returns to step S107 to determine whether one or more additional separate components is to be added.

When the determination in step S107 indicates that no more components are to be added, or step S105 proceeds directly to step S115, the one or more continuous surfaces are machined to form one or more finished continuous surfaces. For example, the one or more continuous surfaces is subjected to post process machining.

It should be noted that in certain embodiments, material may not need to be added after each machining process. For example, the material may be added only after all components, or a predetermined subset, of the components have been added to the work piece. Further, post processing may be performed after any one or more steps of adding material.

Figure 3:
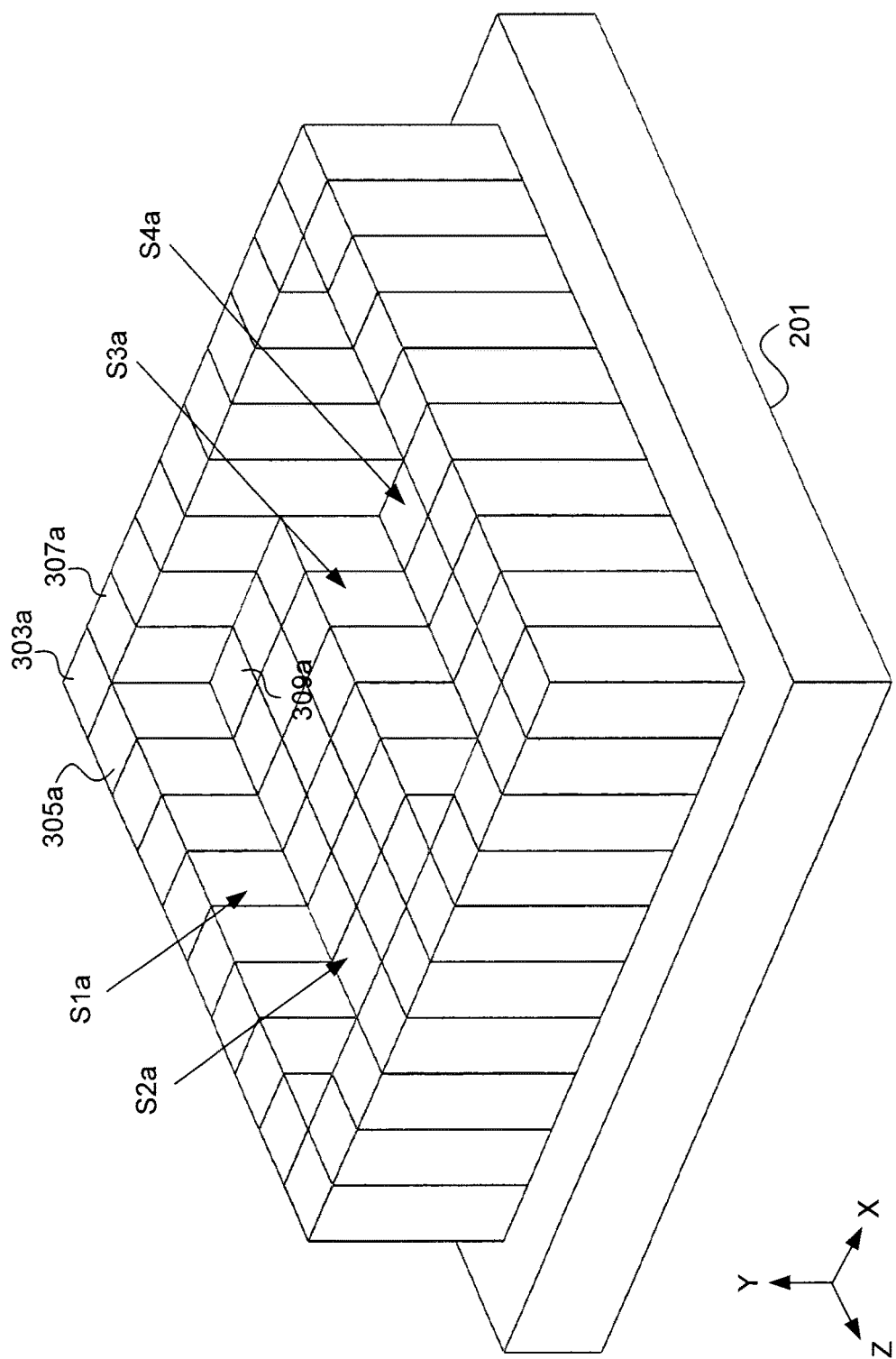
FIG. 3 is a block arrangement used in the die/mold manufacturing process according to an exemplary embodiment of present disclosure.

As described above, the work piece includes a plurality of separate components that is grouped in a manner that approximates the final geometry of the predetermined object. In certain embodiments, all the separate components that form the work piece are grouped in step S101. In other embodiments, only a subset of the total number of separate components that form the work piece is grouped in step S101. FIG. 3 illustrates an example of separate components of the work piece that are positioned to form a substantially approximate shape of the final geometry of the predetermined object. The separate components may be placed in a manner that minimizes spaces between them.

Further, in certain embodiments, the manufacturing process includes adding material to the work piece at one or more times during the manufacturing process to form the predetermined object. For example, additional material may be added before, during, or after the grouping in step S101, or before, during, or after the machining in step S103. In one embodiment, the separate components form a frame, skeleton, or any support structure to which material can be added to form the predetermined object.

Figure 1B:
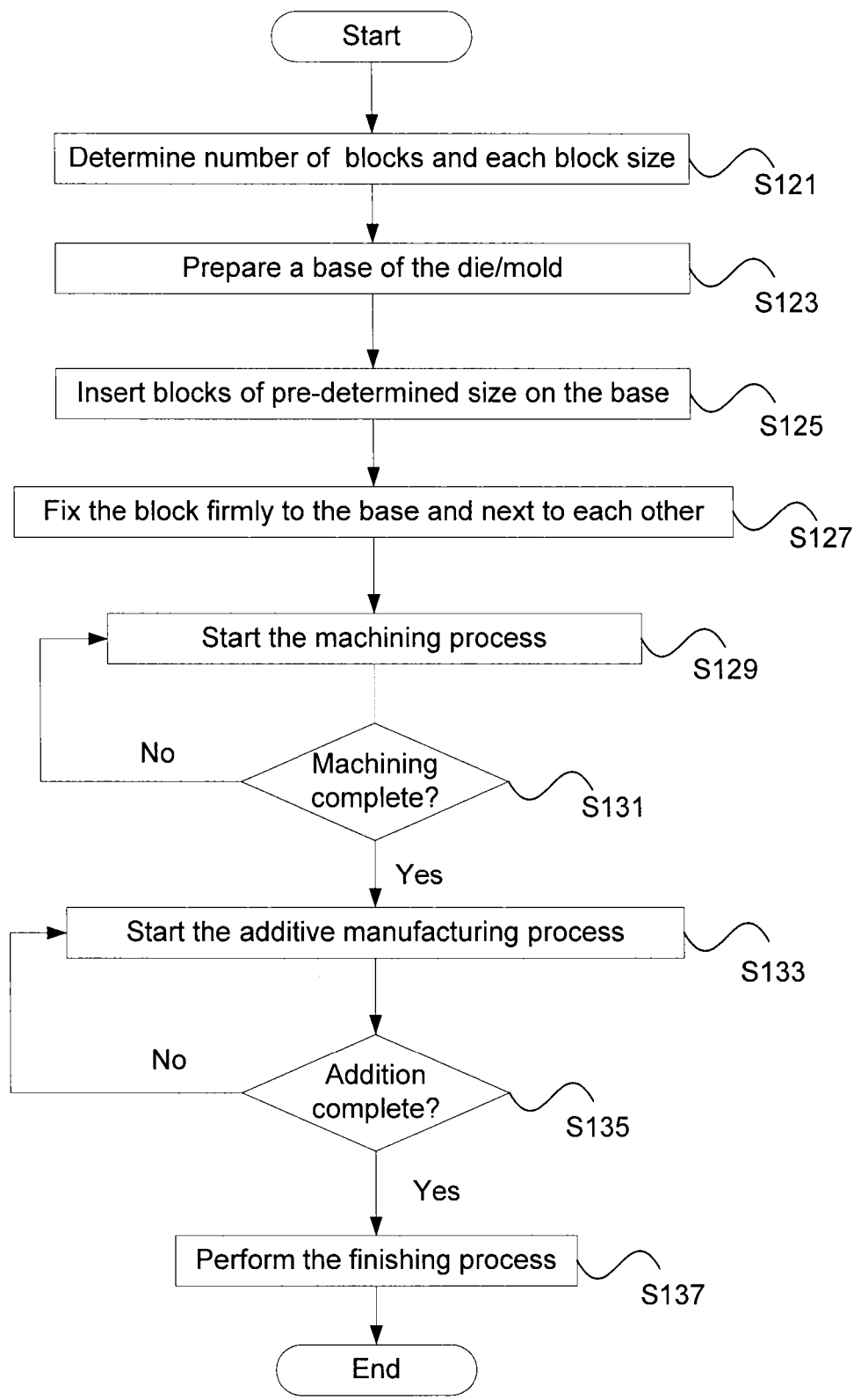
FIG. 1B is a flow chart for a die/mold manufacturing process according to an exemplary embodiment of the present disclosure.

FIG. 1B illustrates a die/mold manufacturing process according to one embodiment. However, it is noted that the process is applicable to the manufacture of other types of objects. The steps described are merely exemplary and may be rearranged or duplicated as needed, for example as described above with respect to FIG. 1A.

A die or a mold is a hollow cavity of a desired shape. Die or molds can be used in manufacturing processes such as casting or stamping. A casting process involves pouring a liquid material in the mold and allowing it to solidify. The mold is reused to manufacture parts of a same shape. The die can be used in a stamping process where a sheet metal is pressed against the die and high pressure is applied until a desired shape of the metal is obtained. The terms "die" and "mold" are used interchangeably in the disclosure and refer to the same object.

A die is typically manufactured from a block of high strength material like hardened steel alloys and requires high machining accuracy. Manufacturing may involve manually machining the material to a desired shape using a material removal process such as milling and drilling. With typical manufacturing, creating complex shapes can be very challenging and may induce inaccuracies. For complex shapes and higher accuracy, an advanced manufacturing process such as computer aided manufacturing (CAM) can be used. CAM involves creating a three-dimensional (3D) computer assisted drawing (CAD) of a desired shape, and programing the 3D drawing into a computer controlled machine. Both processes involve can involve high amounts of material removal, be time consuming, be limited in terms of accuracy, incur high costs, and result in loss of precision and surface quality.

Additive manufacturing is a material addition based manufacturing process as opposed to a material removal process such as milling, drilling etc. It may also be referred to as a 3D printing process. The 3D printing process can be used for manufacturing complex objects. First a 3D drawing of a complex object is input into a computer controlled machine, which deposits material in successive layers to form a desired shape. Additive manufacturing can be used during product development, fir visualization, and for rapid prototyping.

Material removal manufacturing and additive manufacturing methods both have their advantages and disadvantages. New and advanced manufacturing processes are required to create components such as dies and molds quickly and cost effectively, while maintaining the required precision and accuracy of the product.

The process starts when a predetermined object such as a die or a mold to be manufactured is designed and drawings are drafted, using CAD software for example. The die/mold manufacturing process is a multi-step process in which a precisely finished object is obtained from a combination of one or more components of various sizes or shapes, such as blocks. Although FIG. 1B is described with respect to blocks, are separate rectangular shaped components, any other type and shape of components may be utilized. In step S121, the 3D drawing of the object is divided into blocks of different sizes to build a rough shape of the predetermined object. The rough shape may be a skeleton of the final object. A simple meshing technique, which is available in most CAD software, can be used to divide the drawing into a mesh and the mesh size can be further correlated with block sizes available in inventory. The block size selection may be done manually or automatically depending on the complexity of the predetermined object. The inventory of the blocks and their properties such as material, sizes, and shape are maintained in a database according to certain embodiments. To further improve the block selection process, a block selection algorithm that minimizes one or a combination of the amount of material removal, machining, and material addition can be defined, thus increasing manufacturing productivity.

In step S123, a base where blocks are to be inserted for pre-shaping is prepared. In certain embodiments, the base includes a raised border to facilitate pre-shaping. However, the raised border is not required and the base can be any shape to which the blocks may be attached.

The base is created or selected based on the base dimensions of the predetermined object to be manufactured. The base preparation process may involve selecting a suitable base material such as cast iron, drilling holes and machining as necessary. Further, in certain embodiments, the base may be generated using one or more of the steps illustrated in FIG. 1A. In another embodiment, the base may be selected from a standard set of bases available from previously manufactured dies/molds. Reusing the base will not only be economical but save time and resources leading to reduced processing time and faster throughput time.

Hole positions, if necessary for securing blocks, may be determined based on the block sizes. Alternatively, slots may be machined in the base and/or the blocks to create fixed joints between them. For example, dove-tail joint may be created by machining female slots in the base and corresponding male slot on the blocks. In one embodiment, an additive manufacturing process may be used to form connectors or to otherwise secure blocks to the base.

In step S125, the blocks selected in step S121 inserted into, or otherwise brought into contact with, the base. A block of a predetermined size should be inserted in the correct location. The location can be easily identified by following the meshed 3D drawing of the predetermined object. Once the blocks are inserted in the correct position, in step S127, the blocks are secured to the base. For example, the block may be secured to the base using bolts, triangular stud arrangement, welding, etc. In one embodiment, additional holes may be drilled on the side of the blocks to further increase rigidity of the structure by fastening adjacent blocks together.

Figure 8:
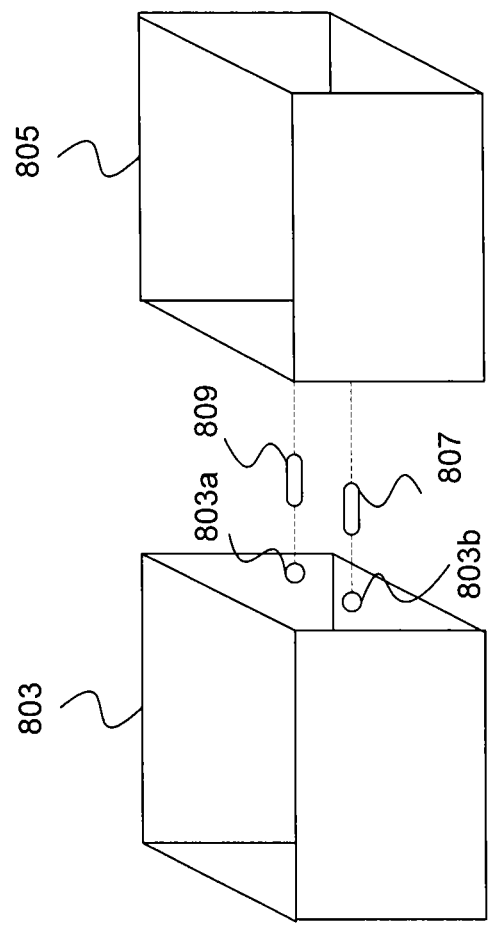
FIG. 8 illustrates a block joining and alignment process according to an embodiment of present disclosure.

For example, FIG. 8 illustrates the joining of two blocks according to one embodiment. In FIG. 8, block 803 contains holes 803a and 803b, and block 805 contains similar holes, on sides facing each other. The blocks 803 and 805 are connected together by studs 807 and 809. A part of the stud 807 is placed inside the hole 803a and a remaining part in the corresponding hole in block 805. Similarly, a part of the stud 809 is placed inside the hole 803b and a remaining part in the corresponding hole in block 805. The holes may also serve as alignment guides. While drilling side holes on the block, the machining operation to be performed on the block to obtain the desired shape should also be taken into account.

After arranging all the blocks and fixing them to the base in correct positions, the machining process can begin, in step S129. The blocks can be machined as a single unit (i.e., work piece) since they are laid out in an orderly manner based on the shape of the object. In case of CAM such as by use of computer numerical control (CNC) machines, different block sizes should be taken into account while writing a CNC machining program. At this stage the machining may not be final and there may be inaccuracies in the desired shape. Hence a determination is made as to whether the machining is completed, in step S131. The determination can be based on the amount of error in the achieved object shape and the desired object shape. In certain embodiments, all the dimensions of the object must be less than the desired object shape by 0% to 5% of the actual object dimensions. The dimensions may be determined using laser measurements.

To increase the productivity and reduce the manufacturing time, in one embodiment, fixtures and additional devices may be implemented to perform the block arrangement processes S125 and S127, and the machining process S129 simultaneously. For example the 3D shape may be divided into a plurality of isolated shapes that can be manufactured independently. Steps S125 and S127 can be performed to create a first isolated shape and the machining process S129 can performed on the first isolated shape, while block arrangement steps S125 and S127 for a second isolated shape is being executed. This also allows for the manufacturing of more complex shapes that may not be possible if all the blocks are placed before any machining processes are performed.

Once the machining is complete, an additive manufacturing process is performed, in step S135. The additive manufacturing process covers the machined surface to create a single surface. In certain embodiments, the additive manufacturing process adds material to the machined object to create one or more features on the work piece. In one embodiment, the additive manufacturing process is performed to build the machined object to the exact dimension of the desired object shape or simply to form a continuous layer on a surface of the work piece. There are several additive manufacturing process such as Laser Welding Deposition (LWD), Direct Energy Deposition, etc. that may be used.

In step S135, a determination is made if the additive manufacturing process is complete. If the geometric shape and dimensions match the desired object with within an error of 0% to 2% , for example, the addition process is said to be complete. This determination may be made based on laser measurements. Further, in step S137, a finishing process is performed for precision and a high surface finish quality. The finishing process used can be buffing, polishing, electro polishing, case hardening etc. to improve the surface finish, quality and accuracy of the manufactured object.

FIGS. 2-5 illustrate step-by-step the die/mold manufacturing process.

Figure 2:
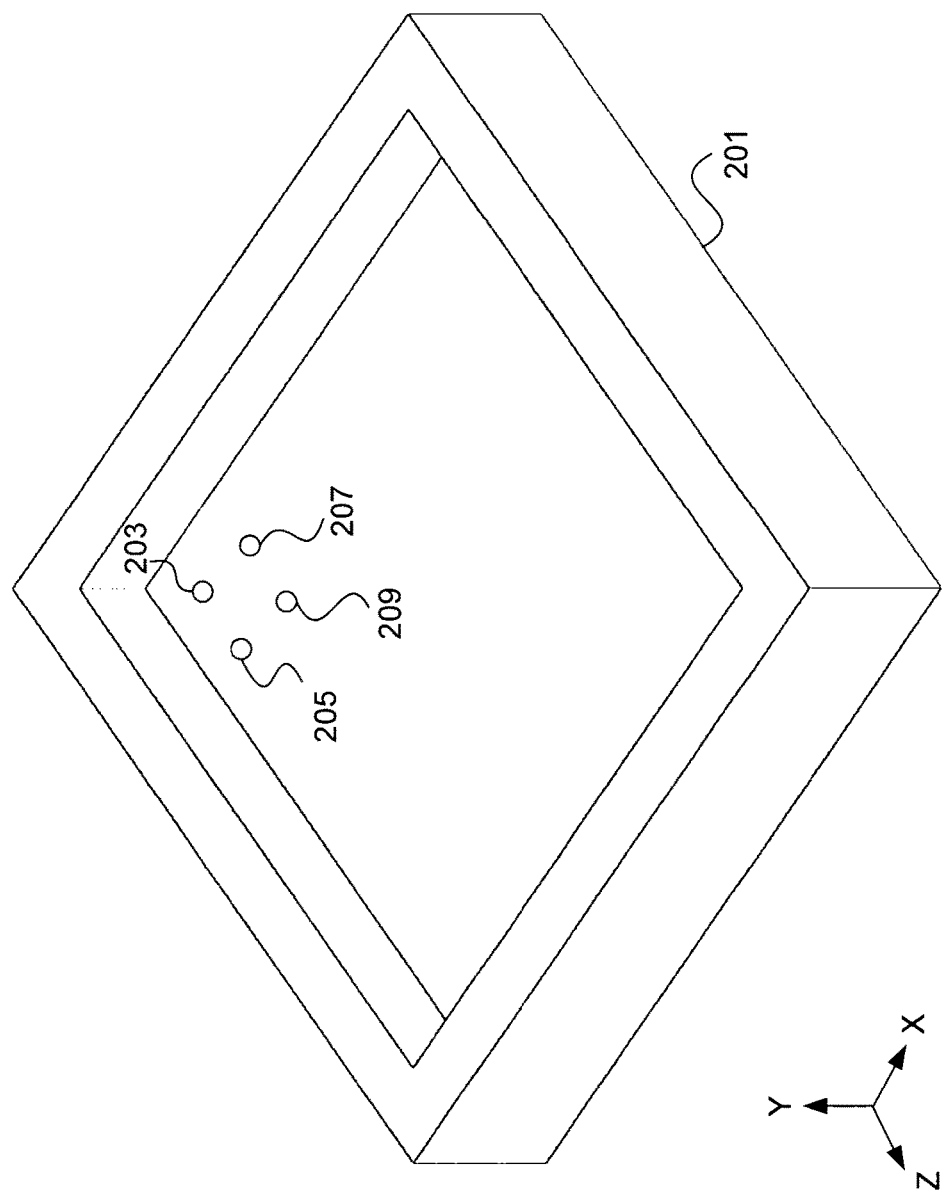
FIG. 2 illustrates a base used in the die/mold manufacturing process according to an embodiment of the present disclosure.

FIG. 2 illustrates an exemplary base. The base may be prepared, as described in S123 earlier. As noted above, in certain embodiments, the base includes a raised border to facilitate pre-shaping. The base is made of a bed 201 made of a rigid material such as one or more metals including steel. The boundary of the bed 201 is raised to align the blocks. Holes are drilled in the bed to secure the blocks. For example, holes 203, 205, 207, and 209 are drilled to secure four blocks, one with each hole. However, the raised border is not required and the base can be any shape to which the blocks may be attached.

FIG. 3 illustrates an exemplary block arrangement that creates a rough shape of the die/mold, as described in steps S125 and S127 of FIG. 1B. The rough shape has a step like structure consisting of surfaces S1a, S2a, S3a and S4a. The rough shape is created using blocks of several different sizes. The block 303a is positioned above the hole 203 and bolted to the base 201. As mentioned earlier, the block may be placed and bolted automatically using a robot or manually. The block 305a is positioned above the hole 205 and bolted to the base 201. Similarly, the blocks 307a and 309a are positioned above the holes 207 and 209 and bolted to the base 201. The remaining blocks may be are laid out and fixed to the base 201 in a similar manner. Also the blocks may be fixed to each other as shown in FIG. 8. In this case, only certain blocks may need to be secured to the base or the base may not be required. After all the blocks are laid out, the machining process starts.

Figure 4:
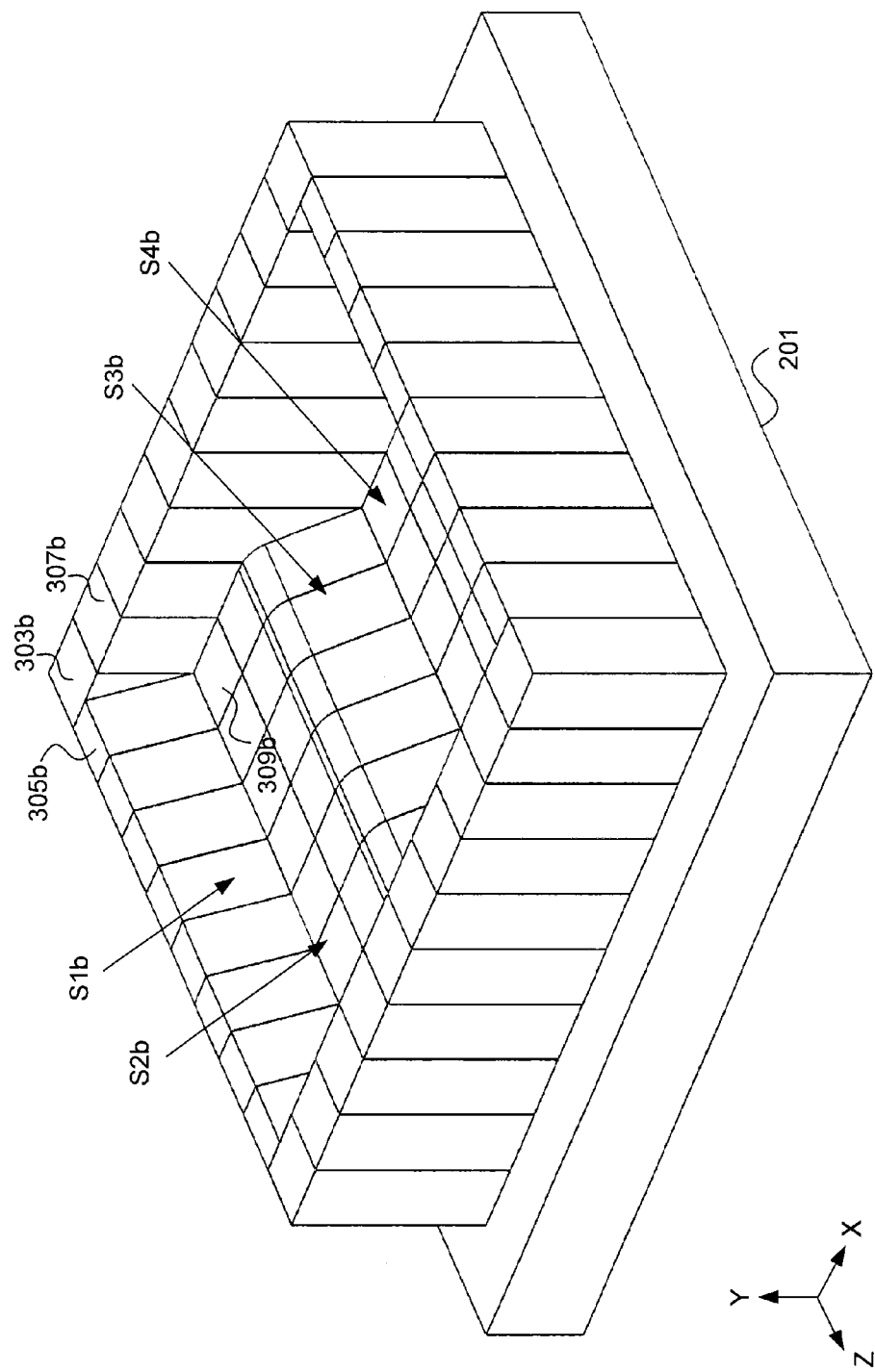
FIG. 4 illustrates the block arrangement after a machining operation according to an embodiment of present disclosure

FIG. 4 illustrates the exemplary block arrangement after the machining process is performed, as described in step S129 of FIG. 1B. The machining is performed on the surfaces S1*b*, S2*b*, S3*b*, and S4*b*. The blocks 303*b* and 307*b* did not need any machining, thus no material removal was necessary. The blocks 305*b* and 309*b* were machined and excess material was removed to create a slant surface S1*b* as shown. Similarly the blocks along the surfaces S2*b*, S3*b*, and S4*b* are machined. The dimensions of the machined shape are smaller than the desired dimensions in one embodiment to allow for the addition of a layer of material.

Although the machining is performed to create a desired shape, the surface is not continuous. Once the machining operation is complete, an additive manufacturing process begins to build a seamless surface and also build up to the exact dimensions as needed. The additive manufacturing process builds the seamless surface by depositing a layer of material on one or more surfaces of the blocks in one embodiment. In another embodiment, the additive manufacturing process builds the seamless surface by filling in spaces between the blocks. A combination of adding a layer and filling of spaces may also be used in certain embodiments.

The above process is not limited to sequential execution of the steps. Some of the steps such as S121 and S123 or S125, S127 and S129 may be executed in parallel without affecting the end product.

Figure 5:
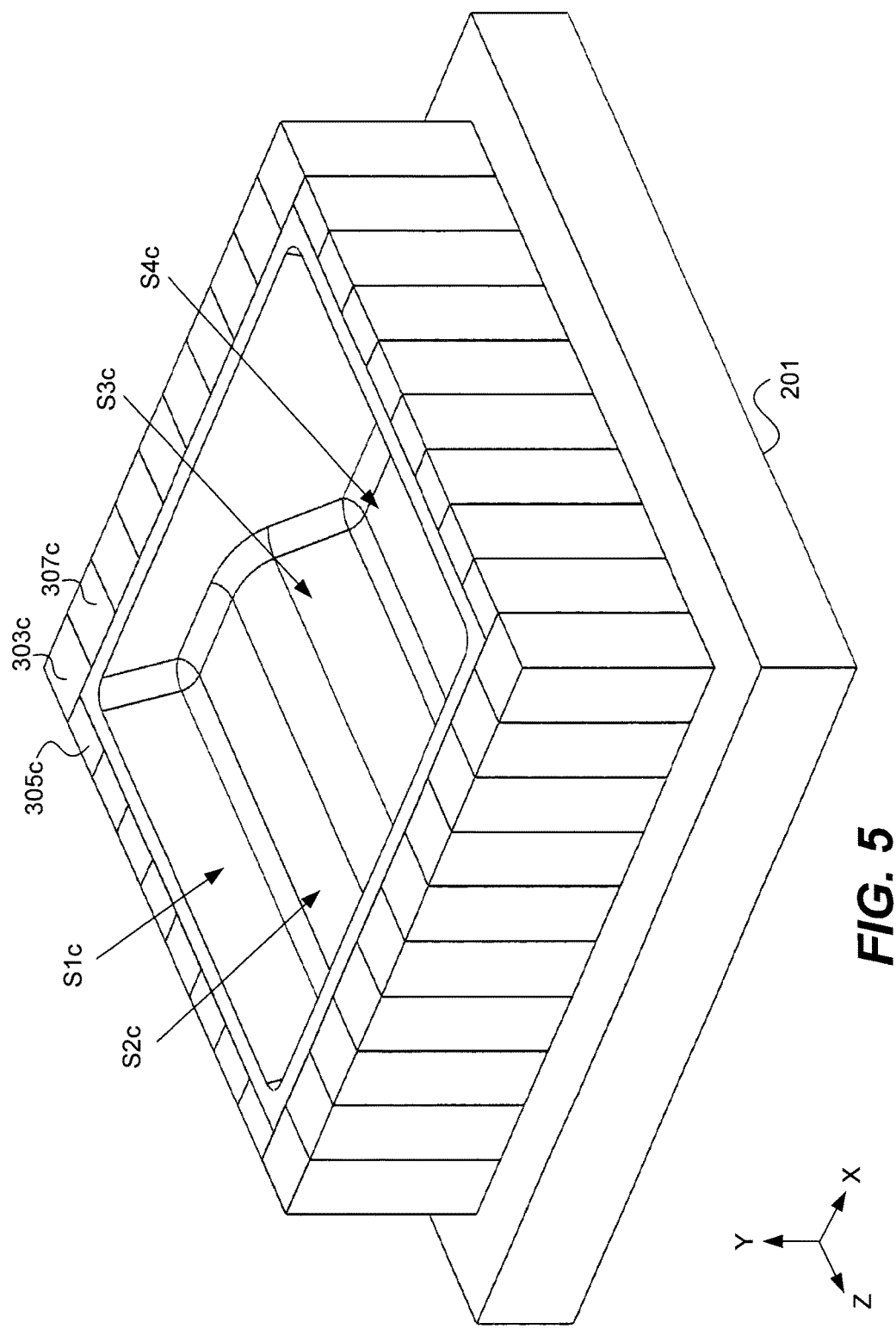
FIG. 5 illustrates the block arrangement after an additive manufacturing according to an embodiment of present disclosure.

FIG. 5 illustrates the exemplary block arrangement after the additive manufacturing process is completed, as described in step S133 of FIG. 1B. The additive manufacturing process is performed on the surfaces such as S1*b*, S2*b*, S3*b*, and S4*b*. The gaps between the blocks are filled during the additive manufacturing process, for example using laser welding deposition.

Figure 6:
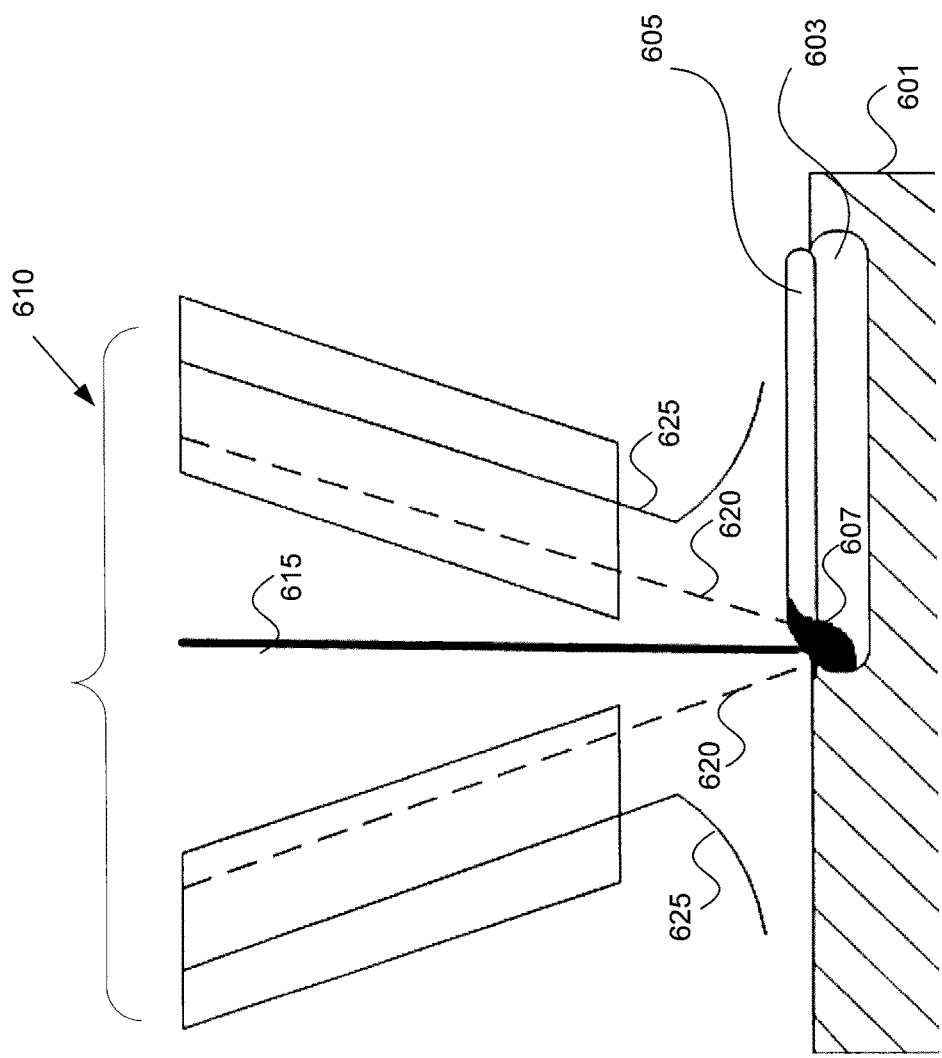
FIG. 6 illustrates a laser welding deposition process according to an embodiment of present disclosure

A cross-sectional view of a laser welding deposition machine that can be used for the additive manufacturing process in certain embodiments is illustrated in FIG. 6. The laser welding deposition machine may be incorporated into a milling hybrid machining center or provided separately from the milling machine. The laser welding deposition machine construction includes a conical nozzle 610. The conical nozzle 610 contains separate holes that direct a laser beam 615, metal powder 620, and shielding gas 625 simultaneously on to a work piece 601. A specific area of the work piece 601 is targeted using the nozzle. The working principle of the laser deposition welding is as follows. The metal powder 620 is welded to the work piece 601 in layers as the conical nozzle moves in a processing direction 620. The laser beam 615 causes local heating of the work piece 601 and the metal powder 620. The part of the work piece 601 affected by the heating due to the laser beam 615 is called the dilution zone 603. Within the dilution zone 603, a melt pool 607 of the metal powder 620 and the work piece 601 is created by the laser beam 615 emitted from the conical nozzle 610. As the conical nozzle moves in the processing direction 620, a metal deposition layer 605 is created on top of the dilution zone 603 of the work piece 601. The metal deposition layer 603 is seamlessly integrated with the work piece 601. A shielding gas 625 is also passed over the melt pool 607 to prevent oxidation during the build-up. Several metal deposition layers 605 may be created by moving the conical nozzle 610 in vertically in small increments until the desired dimensions of the object are achieved. After cooling the metal deposition layer 605, an additional machining process (e.g., a finishing process) can be performed.

Referring back to FIG. 5, the blocks 303*c*, 305*c*, 307*c*, and 309*c* can be welded together. Further, material can be added to build the blocks to the desired dimensions and shape. The welding and deposition can create a smooth and uniform surface. However, in certain embodiments, a finishing process is performed to create the final smooth and/or uniform surface.

Figure 7:
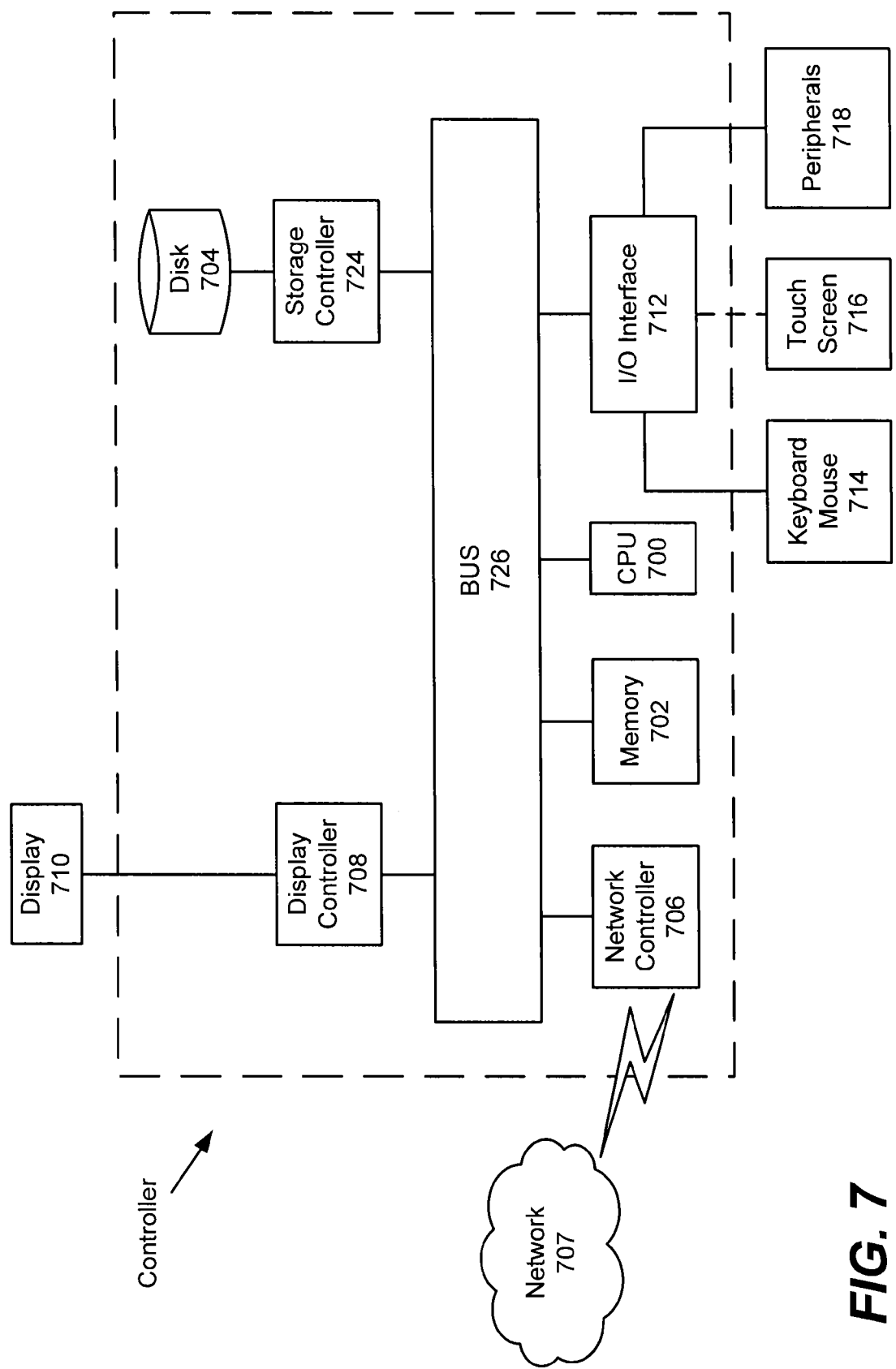
FIG. 7 illustrates an exemplary hardware block diagram for implementing one or more aspects of the embodiments of the present disclosure.

The predetermined object and/or die/mold manufacturing process can be performed automatically by programming a controller that implements one or more of the processes illustrated in FIGS. 1A and 1B. An exemplary hardware configuration, which includes circuitry, for implementation of the controller is illustrated in FIG. 7. The controller includes a CPU 700 which executes one or more instructions to perform one or more of the processes described above. Process data (e.g., data pertaining to the predetermined object) and the instructions may be stored in a memory 702. The process data and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer aided design station communicates, such as a server or computer.

Further, the claimed advancements may be provided as a utility application, background daemon, or component of an operating system, or combination thereof, executing in conjunction with CPU 700 and an operating system such as MICROSOFT WINDOWS 7, UNIX, SOLARIS, LINUX, APPLE MAC OS and other systems known to those skilled in the art.

CPU 700 may be a XENON or Core processor from INTEL of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The controller in FIG. 7 also includes a network controller 706, such as an INTEL Ethernet PRO network interface card from INTEL Corporation of America, for interfacing with a network 707. As can be appreciated, the network 707 can be a public network, such as the Internet, or a private network such as an LAN or WAN network, or any combination thereof and can also include PSTN or ISDN sub-networks. A connection to the network 707 can be wired, such as an Ethernet network, or can be wireless such as a cellular network including EDGE, 3G and 4G wireless cellular systems. The wireless network can also be WIFI, BLUETOOTH, or any other wireless form of communication that is known.

The controller further includes a display controller 708, such as a NVIDIA GEFORCE GTX or Quadro graphics adaptor from NVIDIA Corporation of America for interfacing with a display 710, such as a Hewlett Packard HPL2445w LCD monitor. A general purpose I/O interface 712 interfaces with a keyboard and/or mouse 714 as well as a touch screen panel 716 on or separate from display 710.

General purpose I/O interface is configured to connect to a variety of peripherals 718 including printers and scanners, such as an OFFICEJET or DESKJET from Hewlett Packard.

The general purpose storage controller 724 connects the storage medium disk 704 with communication bus 726, which may be an ISA, EISA, VESA, PCI, or similar, for interconnecting all of the components of the controller. A description of the general features and functionality of the display 710, keyboard and/or mouse 714, as well as the display controller 708, storage controller 724, network controller 706, and other general purpose I/O interfaces 712 is omitted herein for brevity as these features are known.

Figure 9:
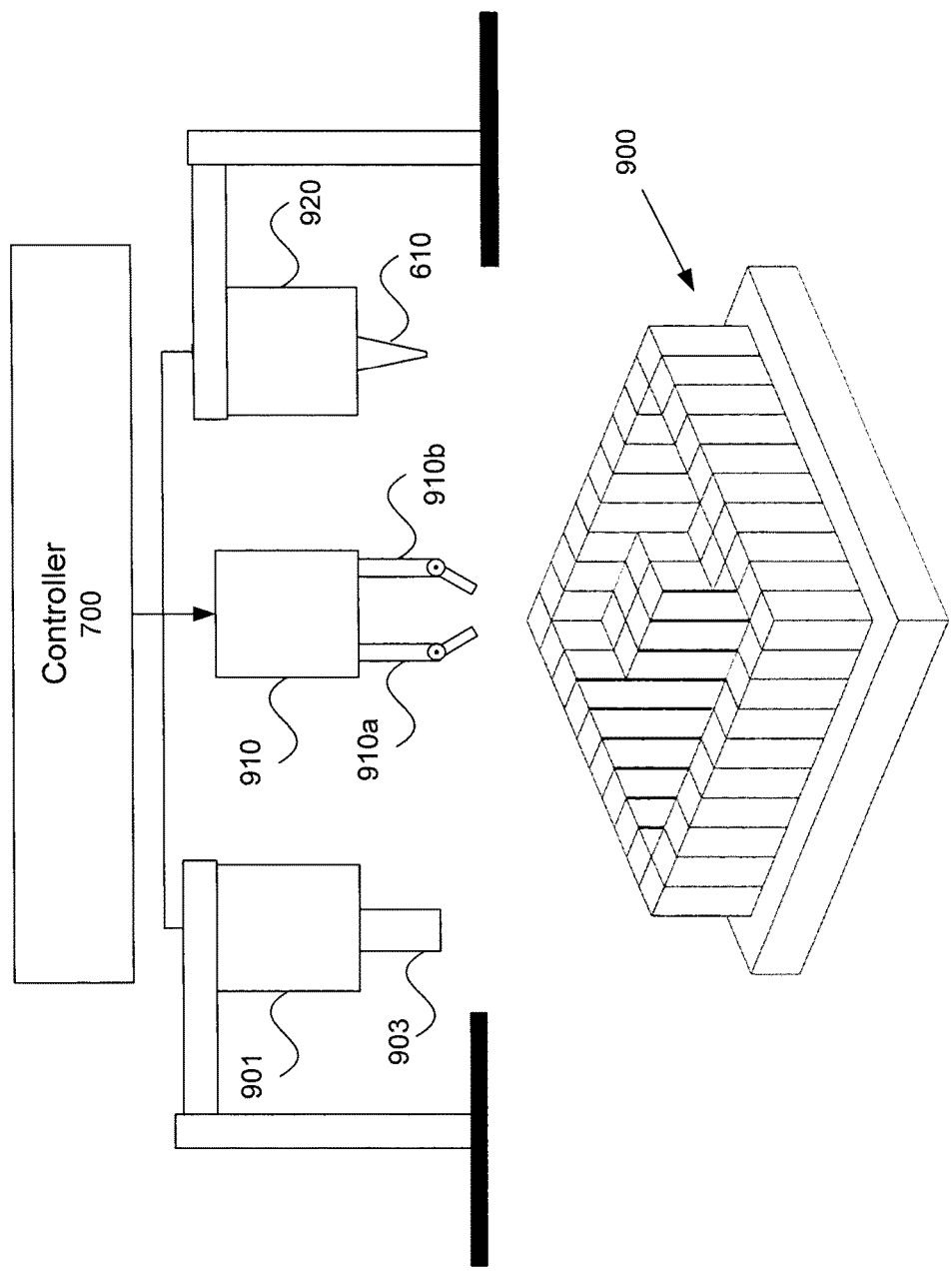
FIG. 9 illustrates a hybrid machining center according to an embodiment of the present disclosure.

FIG. 9 illustrates a block diagram of an exemplary hybrid machining center that can be configured to manufacture a predetermined object from a work piece made of separate components. The hybrid machining center includes at least one of the following machines: a material removal machine 901 such as for drilling or milling, a component arrangement robot 910, and an additive manufacturing machine 920 such as for laser welding deposition. The hybrid machine center includes, or is connected to, the controller to control the operations of the different machines on the work piece 900. An example of hardware implementation of the controller was discussed earlier with reference to FIG. 7.

The material removal machine 901 includes a tool holder 903 to attach appropriate tools such as a milling tool or a drilling tool. The component arrangement robot 910 includes robotic arms such as 910a and 910b to enable lifting and fixing the components to create a work piece. The additive manufacturing machine 920 includes a conical nozzle 610 to perform welding and material deposition on the work piece 900. An exemplary conical nozzle 610 was discussed earlier with reference to FIG. 6. The tool holder 903, robotic arms 910a and 910b, and the conical nozzle 610 are referred to as tooling elements of the machines hereafter.

The material removal machine 901, the component arrangement robot 910, and the additive manufacturing machine 920 may be fixed and the work piece may be transported between the different machines to create the final predetermined object. For instance, the work piece 900 can be moved from one machine to another via a conveyor belt. Alternatively, the work piece 900 can remain stationary and tooling elements of the machines must be movable over the work piece 900. Further, all three machines may be operated simultaneously or in sequence depending on the programming instructions input to the controller.

Also, it should be understood that this technology when embodied is not limited to the above-described embodiments and that various modifications, variations and alternatives may be made of this technology so far as they are within the spirit and scope thereof. For example, this technology may be structured for cloud computing whereby a single function is shared and processed in collaboration among a plurality of apparatuses via a network.

The above disclosure also encompasses the embodiments noted below.

(1) A method for manufacturing a predetermined object, the method including machining a plurality of separate components of a work piece based on a final geometry of the predetermined object. the plurality of separate components being selected based on the final geometry of the predetermined object; and adding a first material to the work piece such that a first single continuous surface is formed over, or together with, the machined surfaces of the plurality of separate components which is selected based on the final geometry of the predetermined object.

(2) The method according to feature (1), further including machining the first single continuous surface to form a finished continuous surface.

(3) The method according to feature (1) or (2), further including securing the plurality of separate components of the work piece to a base before the plurality of separate components are machined.

(4) The method according to any of features (1) to (3), further including determining the final geometry of the predetermined object; and selecting the plurality of separate components based on the determined final geometry of the predetermined object.

(5) The method according to any of features (1) to (4), in which the plurality of separate components includes blocks of different sizes.

(6) The method according to any of features (1) to (5), in which the steps of machining and adding are performed in a single additive and milling hybrid machining center.

(7) The method according to any of features (1) to 6), including after the plurality of separate components of the work piece is machined, adding a separate component to the work piece, and machining the separate component.

(8) A non-transitory computer-readable medium storing instructions which when executed by a computer, causes at least one machining center to perform a method for manufacturing a predetermined object, the method including machining a plurality of separate components of a work piece based on a final geometry of the predetermined object, the plurality of separate components being selected based on the final geometry of the predetermined object; and adding a first material to the work piece such that a first single continuous surface is formed over, or together with, the machined surfaces of the plurality of separate components which is selected based on the final geometry of the predetermined object.

(9) The non-transitory computer-readable medium according to feature (8), the method further including machining the first single continuous surface to form a finished continuous surface.

(10) The non-transitory computer-readable medium according to feature (8) or (9), further including securing the plurality of separate components of the work piece to a base before the plurality of separate components are machined.

(11) The non-transitory computer-readable medium according to any of features (8) to (10), further including determining a final geometry of the predetermined object; and selecting the plurality of separate components based on the determined final geometry of the predetermined object.

(12) The non-transitory computer-readable medium according to any of features (8) to (11), in which the plurality of separate components includes blocks of different sizes.

(13) The non-transitory computer-readable medium according to any of features (8) to (12), in which the steps of machining and adding are performed in a single additive and milling hybrid machining center.

(14) The non-transitory computer-readable medium according to any of features (8) to (13), further including after the plurality of separate components of the work piece is machined, adding a separate component to the work piece, and machining the separate component.

(15) A controller for manufacturing a predetermined object, the controller including circuitry configured to cause a material removal tool to machine a plurality of separate components of a work piece based on a final geometry of the predetermined object, the plurality of separate components being selected based on the final geometry of the predetermined object; and cause a material deposition tool to add a first material to the work piece such that a first single continuous surface is formed over, or together with, the machined surfaces of the plurality of separate components which is selected based on the final geometry of the predetermined object.

(16) The controller according to feature (15), in which the circuitry is further configured to cause a finishing tool to machine the first single continuous surface to form a finished continuous surface.

(17) The controller according to feature (15) or (16), in which the circuitry is further configured to cause a machining center, which includes the material removal tool, to secure the plurality of separate components of the work piece to a base before the plurality of separate components are machined.

(18) The controller according to any of features (15) to (17), in which the circuitry is further configured to determine a final geometry of the predetermined object; and select the plurality of separate components based on the determined final geometry of the predetermined object.

(19) The controller according to any of features (15) to (18), in which the plurality of separate components includes blocks of different sizes.

(20) The controller according to any of features (15) to (19), in which the circuitry is further configured to after the plurality of separate components of the work piece is machined, causing the machining center to add a separate component to the work piece, and causing the machining center to machine the separate component.

What is claimed is:

1. A method for manufacturing a predetermined object, the method comprising:
   machining a work piece, which is formed by a plurality of separate components, to remove excess material from the work piece based on a final geometry of the predetermined object to be manufactured from the work piece, the plurality of separate components being selected based on the final geometry of the predetermined object and arranged to approximate the final geometry of the predetermined object; and
   adding a first material to the machined work piece using a laser beam such that a first single continuous surface is formed over, or together with, the machined surfaces of the plurality of separate components which is selected based on the final geometry of the predetermined object, the first material being a metal powder, wherein
   each of the plurality of separate components has ends that are formed on parallel end planes and sides that are formed on side planes that are perpendicular to the end planes of the respective separate component.

2. The method according to claim 1, further comprising: machining the first single continuous surface to form a finished continuous surface.

3. The method according to claim 1, further comprising: securing the plurality of separate components of the work piece to a base before the plurality of separate components is machined.

4. The method according to claim 1, further comprising: determining the final geometry of the predetermined object; and
   selecting the plurality of separate components based on the determined final geometry of the predetermined object.

5. The method according to claim 1, wherein
   the plurality of separate components includes blocks of different sizes, and
   the blocks of different sizes are arranged to approximate the final geometry of the predetermined object.

6. The method according to claim 1, wherein the steps of machining and adding are performed in a single additive and milling hybrid machining center.

7. The method according to claim 1, further comprising:
   after the plurality of separate components of the work piece is machined,
   adding a separate component to the work piece, and
   machining the separate component.

8. A non-transitory computer-readable medium storing instructions which when executed by a computer, cause at least one machining center to perform a method for manufacturing a predetermined object, the method comprising:
   machining a work piece, which is formed by a plurality of separate components, to remove excess material from the work piece based on a final geometry of the predetermined object to be manufactured from the work piece, the plurality of separate components being selected based on the final geometry of the predetermined object and arranged to approximate the final geometry of the predetermined object; and
   adding a first material to the machined work piece using a laser beam such that a first single continuous surface is formed over, or together with, the machined surfaces of the plurality of separate components which is selected based on the final geometry of the predetermined object, the first material being a metal powder, wherein
   each of the plurality of separate components has ends that are formed on parallel end planes and sides that are formed on side planes that are perpendicular to the end planes of the respective separate component.

9. The non-transitory computer-readable medium according to claim 8, the method further comprising:
   machining the first single continuous surface to form a finished continuous surface.

10. The non-transitory computer-readable medium according to claim 8, further comprising:
    securing the plurality of separate components of the work piece to a base before the plurality of separate components machined.

11. The non-transitory computer-readable medium according to claim 8, further comprising:
    determining the final geometry of the predetermined object; and
    selecting the plurality of separate components based on the determined final geometry of the predetermined object.

12. The non-transitory computer-readable medium according to claim 8, Wherein
    the plurality of separate components includes blocks of different sizes, and
    the blocks of different sizes are arranged to approximate the final geometry of the predetermined object.

13. The non-transitory computer-readable medium according to claim 8, wherein the steps of machining and adding are performed in a single additive and milling hybrid machining center.

14. The non-transitory computer-readable medium according to claim 8, further comprising:
    after the plurality of separate components of the work piece is machined,
    adding a separate component to the work piece, and
    machining the separate component.

15. A controller for manufacturing a predetermined object, the controller comprising:
   circuitry configured to
      cause a material removal tool to machine a work piece, which is formed by a plurality of separate components, to remove excess material from the work piece based on a final geometry of the predetermined object to be manufactured from the work piece, the plurality of separate components being selected based on the final geometry of the predetermined object and arranged to approximate the final geometry of the predetermined object; and
      cause a material deposition tool to add a first material to the machined work piece using a laser beam such that a first single continuous surface is formed over, or together with, the machined surfaces of the plurality of separate components which is selected based on the final geometry of the predetermined object, the first material being a metal powder, wherein
      each of the plurality of separate components has ends that are formed on parallel end planes and sides that are formed on side planes that are perpendicular to the end planes of the respective separate component.

16. The controller according to claim 15, wherein the circuitry is further configured to:
   cause a finishing tool to machine the first single continuous surface to form a finished continuous suffice.

17. The controller according to claim 15, wherein the circuitry is further configured to:
   cause a machining center, which includes the material removal tool, to secure the plurality of separate components of the work piece to a base before the plurality of separate components is machined.

18. The controller according to claim 15, wherein the circuitry is further configured to:
   determine the final geometry of the predetermined object; and
   select the plurality of separate components based on the determined final geometry of the predetermined object.

19. The controller according to claim 15, wherein
   the plurality of separate components include blocks of different sizes, and
   the blocks of different sizes are arranged to approximate the final geometry of the predetermined object.

20. The controller according to claim 15, wherein the circuitry is further configured to:
   after the plurality of separate components of the work piece is machined,
   cause the machining center to add a separate component to the work piece, and
   cause the machining center to machine the separate component.

* * * * *